US012683384B2

(12) United States Patent
Korkmaz et al.

(10) Patent No.: US 12,683,384 B2
(45) Date of Patent: Jul. 14, 2026

(54) VOLTAGE SELECTION CONTROL SCHEME FOR SYNCHRONISM CHECK IN DIGITAL SUBSTATIONS

(71) Applicant: Schweitzer Engineering Laboratories, Inc., Pullman, WA (US)

(72) Inventors: Yusuf Zafer Korkmaz, Ascot (GB); Sagar Dayabhai, Reading (GB)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 251 days.

(21) Appl. No.: 18/736,304

(22) Filed: Jun. 6, 2024

(65) Prior Publication Data

US 2024/0413629 A1    Dec. 12, 2024

Related U.S. Application Data

(60) Provisional application No. 63/506,977, filed on Jun. 8, 2023.

(51) Int. Cl.
| | | |
|---|---|---|
| *H02H 7/00* | (2006.01) | |
| *H02H 3/05* | (2006.01) | |
| *H02H 7/26* | (2006.01) | |
| *H02J 13/333* | (2026.01) | |
| *H02J 13/36* | (2026.01) | |

(52) U.S. Cl.
CPC .............. *H02H 7/262* (2013.01); *H02H 3/05* (2013.01); *H02J 13/333* (2026.01); *H02J 13/36* (2026.01)

(58) Field of Classification Search
CPC ...................................................... H02H 7/262
See application file for complete search history.

(56) References Cited

U.S. PATENT DOCUMENTS

| | | | | |
|---|---|---|---|---|
| 5,784,239 A | * | 7/1998 | Bouhenguel | ........... H02H 3/063 |
| | | | | 361/59 |
| 7,460,590 B2 | | 12/2008 | Lee | |
| 7,693,607 B2 | | 4/2010 | Kasztenny | |

(Continued)

FOREIGN PATENT DOCUMENTS

| | | |
|---|---|---|
| CN | 203376828 | 1/2014 |
| CN | 106301952 | 1/2017 |

(Continued)

OTHER PUBLICATIONS

Finney, Dale; Mynam, Mangapathirao; Donolo, Marcos; Sinclair, Amy: "Design of a Centralized Substation Synchronizing System" Power and Energy Automation Conference, Mar. 2014.

(Continued)

*Primary Examiner* — Stephen W Jackson
(74) *Attorney, Agent, or Firm* — Jared L. Cherry; Richard M. Edge

(57) ABSTRACT

A system for voltage signal distribution in a digital substation protection system. In a system where a voltage signal from a bus is not available, an alternative voltage secondary signal may be selected as a reference voltage and made available to the appropriate protection devices in a digital substation protection system for synchronism check. Voltage signals may be distributed using software-defined networking. A voltage selection controller may select the reference voltage and control distribution of the voltage signal using the software-defined networking communication system.

20 Claims, 4 Drawing Sheets

(56) References Cited

U.S. PATENT DOCUMENTS

| | | | |
|---|---|---|---|
| 7,710,999 | B2 | 5/2010 | Bolder |
| 8,405,944 | B2 | 3/2013 | Donolo |
| 8,824,274 | B1 | 9/2014 | Medved |
| 9,047,143 | B2 | 6/2015 | Pruss et al. |
| 9,083,177 | B2 * | 7/2015 | Andersen ................ H02H 7/06 |
| 9,124,485 | B2 | 9/2015 | Heron et al. |
| 9,137,140 | B2 | 9/2015 | Tao et al. |
| 9,178,807 | B1 | 11/2015 | Chua et al. |
| 9,258,212 | B2 | 2/2016 | Pfeifer et al. |
| 9,258,315 | B2 | 2/2016 | Martin et al. |
| 9,270,754 | B2 | 2/2016 | Iyengar et al. |
| 9,276,827 | B2 | 3/2016 | Voit et al. |
| 9,282,164 | B2 | 3/2016 | Finn et al. |
| 9,330,156 | B2 | 5/2016 | Satapathy et al. |
| 9,356,871 | B2 | 5/2016 | Medved et al. |
| 9,392,050 | B2 | 7/2016 | Voit et al. |
| 9,467,536 | B1 | 10/2016 | Kanekar et al. |
| 9,503,363 | B2 | 11/2016 | Pinho et al. |
| 9,596,141 | B2 | 3/2017 | McDowall et al. |
| 9,923,779 | B2 | 3/2018 | Berner |
| 10,560,390 | B2 * | 2/2020 | Gammel ............ H04L 41/0816 |
| 10,652,084 | B2 | 5/2020 | Witko |
| 10,756,956 | B2 | 8/2020 | Gammel |
| 10,782,328 | B2 | 9/2020 | Abubakari |
| 10,812,392 | B2 | 10/2020 | Gammel |
| 10,896,658 | B1 * | 1/2021 | Schweitzer, III ...... G09G 5/006 |
| 11,050,234 | B2 | 6/2021 | Schweitzer |
| 11,258,249 | B2 | 2/2022 | Schweitzer |
| 11,425,033 | B2 | 8/2022 | Kalra |
| 2002/0144156 | A1 | 10/2002 | Copland |
| 2007/0067132 | A1 | 3/2007 | Tziouvaras |
| 2007/0147415 | A1 | 6/2007 | Marusca |
| 2007/0217343 | A1 | 9/2007 | Znamova |
| 2007/0280239 | A1 | 12/2007 | Lund |
| 2008/0095059 | A1 | 4/2008 | Chu |
| 2009/0296583 | A1 | 12/2009 | Dolezilek |
| 2010/0097945 | A1 | 4/2010 | Raftelis |
| 2010/0324845 | A1 | 12/2010 | Spanier |
| 2012/0300615 | A1 | 11/2012 | Kempf |
| 2012/0300859 | A1 | 11/2012 | Chapman |
| 2012/0331534 | A1 | 12/2012 | Smith |
| 2013/0121400 | A1 | 5/2013 | Eliezer et al. |
| 2013/0163475 | A1 | 6/2013 | Beliveau |
| 2013/0311675 | A1 | 11/2013 | Kancherla et al. |
| 2014/0003422 | A1 | 1/2014 | Mogul |
| 2014/0095685 | A1 | 4/2014 | Cvijetic et al. |
| 2014/0104738 | A1 | 4/2014 | Schweitzer, III |
| 2014/0109182 | A1 | 4/2014 | Smith et al. |
| 2014/0280893 | A1 | 9/2014 | Pfeifer et al. |
| 2014/0317248 | A1 | 10/2014 | Holness et al. |
| 2014/0317256 | A1 | 10/2014 | Jiang et al. |
| 2014/0317293 | A1 | 10/2014 | Shatzkamer et al. |
| 2014/0330944 | A1 | 11/2014 | Dabbiere et al. |
| 2014/0365634 | A1 | 12/2014 | Metz et al. |
| 2015/0130935 | A1 | 5/2015 | Siann et al. |
| 2015/0281036 | A1 | 10/2015 | Sun et al. |
| 2016/0014819 | A1 | 1/2016 | Cona |
| 2016/0112269 | A1 | 4/2016 | Singh et al. |
| 2016/0139939 | A1 | 5/2016 | Bosch et al. |
| 2016/0142427 | A1 | 5/2016 | de los Reyes et al. |
| 2016/0234234 | A1 | 8/2016 | McGrew et al. |
| 2017/0019417 | A1 | 1/2017 | McGrew et al. |
| 2017/0026291 | A1 | 1/2017 | Smith |
| 2017/0026349 | A1 | 1/2017 | Smith et al. |
| 2017/0054626 | A1 | 2/2017 | Sivabalan et al. |
| 2017/0070416 | A1 | 3/2017 | Narayanan et al. |
| 2017/0142034 | A1 | 5/2017 | K |
| 2017/0288947 | A1 | 10/2017 | Kaniampady |
| 2017/0288950 | A1 | 10/2017 | Manson |
| 2018/0089057 | A1 * | 3/2018 | Yang ...................... H04L 45/70 |
| 2018/0176090 | A1 | 6/2018 | Lessmann |
| 2018/0241621 | A1 | 8/2018 | Vaishnavi |
| 2018/0287725 | A1 | 10/2018 | Rabinovich |
| 2018/0287859 | A1 | 10/2018 | Desigowda |
| 2018/0323611 | A1 | 11/2018 | Gubba Ravikumar |
| 2019/0007862 | A1 | 1/2019 | Ha |
| 2019/0103762 | A1 | 4/2019 | Dolezilek |
| 2019/0273686 | A1 | 9/2019 | Gammel et al. |
| 2021/0109157 | A1 * | 4/2021 | Schweitzer, III ...... G01R 35/02 |
| 2021/0111586 | A1 * | 4/2021 | Schweitzer, III ....... H02J 13/12 |

FOREIGN PATENT DOCUMENTS

| | | |
|---|---|---|
| EP | 3109128 | 12/2016 |
| WO | 2016206741 | 12/2016 |

OTHER PUBLICATIONS

Ferrus, et al., "SDN/NFV-enabled satellite communications networks: Opportunities, scenarios and challenges." In: Physical Communication. Mar. 2016 (Mar. 2016).

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).

Gember et al., "Toward Software-Defined Middlebox Networking" In: Proceedings of the 11th ACM Workshop on Hot Topics in Networks. Oct. 30, 2012.

Molina et al., "Performance Enhancement of High-Availability Seamless Redundancy (HSR) Networks Using OpenFlow" IEEE, Nov. 30, 2015.

* cited by examiner

Figure 4:
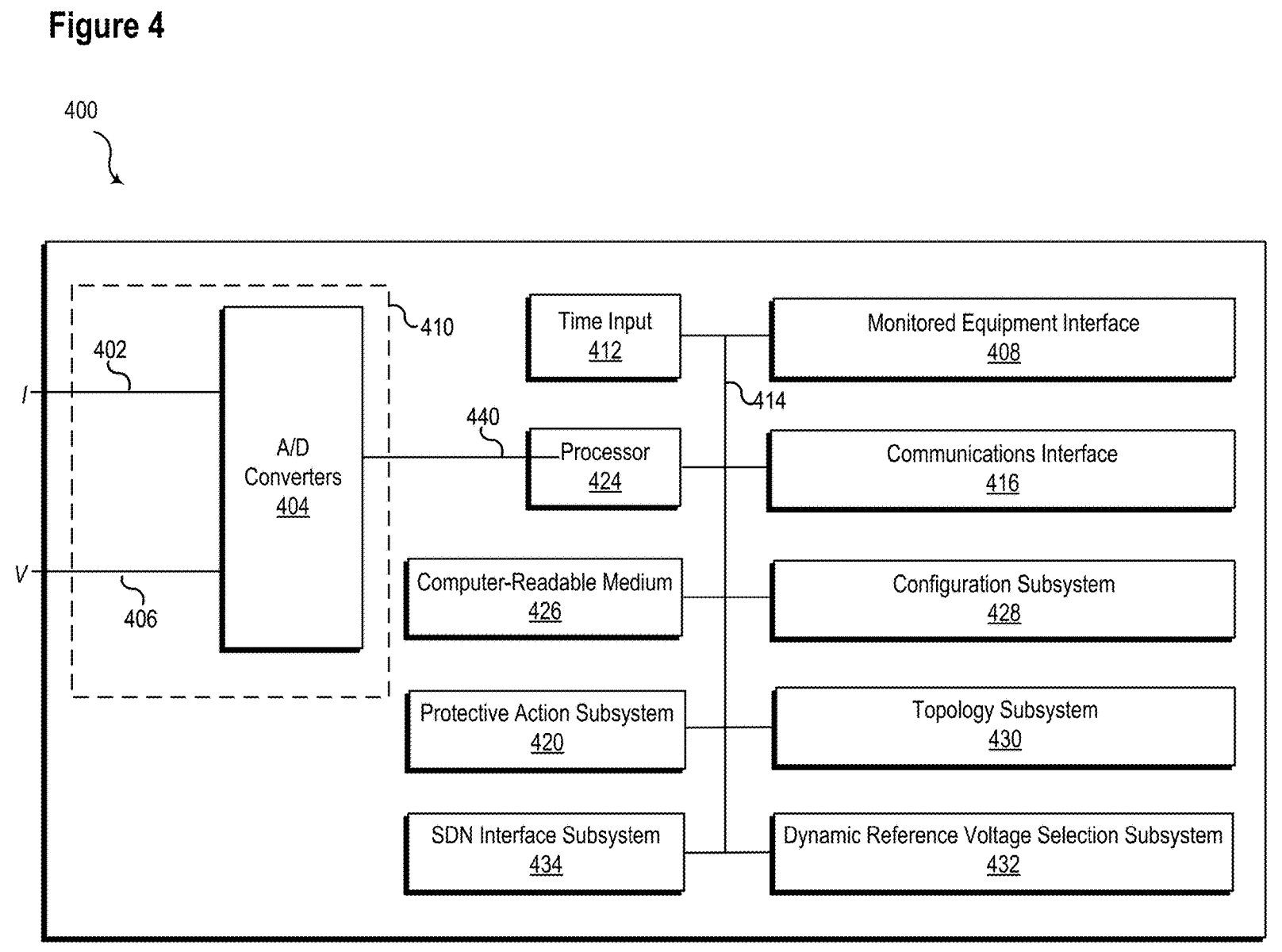

A/D Converters 404

402

406

440

Time Input 412

Processor 424

Computer-Readable Medium 426

Protective Action Subsystem 420

SDN Interface Subsystem 434

414

Monitored Equipment Interface 408

Communications Interface 416

Configuration Subsystem 428

Topology Subsystem 430

Dynamic Reference Voltage Selection Subsystem 432

I

V

VOLTAGE SELECTION CONTROL SCHEME FOR SYNCHRONISM CHECK IN DIGITAL SUBSTATIONS

RELATED APPLICATIONS

This application claims priority to U.S. Provisional Patent Application No. 63/506,977 filed on Jun. 8, 2023, and titled Voltage Selection Control Scheme for Synchronism-Check in Digital Substations, the entirety of which is incorporated herein by reference.

TECHNICAL FIELD

This disclosure relates to secondary signal distribution for protection in a digital substation. More particularly, this disclosure relates to the use of software-defined network ("SDN") technology to provide a digital method of distributing voltage signals for substation protection.

BRIEF DESCRIPTION OF THE DRAWINGS

Non-limiting and non-exhaustive embodiments of the disclosure are described, including various embodiments of the disclosure with reference to the figures, in which:

FIG. 4 illustrates a functional block diagram of a control system for use in an electric power system consistent with embodiments of the present disclosure.

Figure 1:
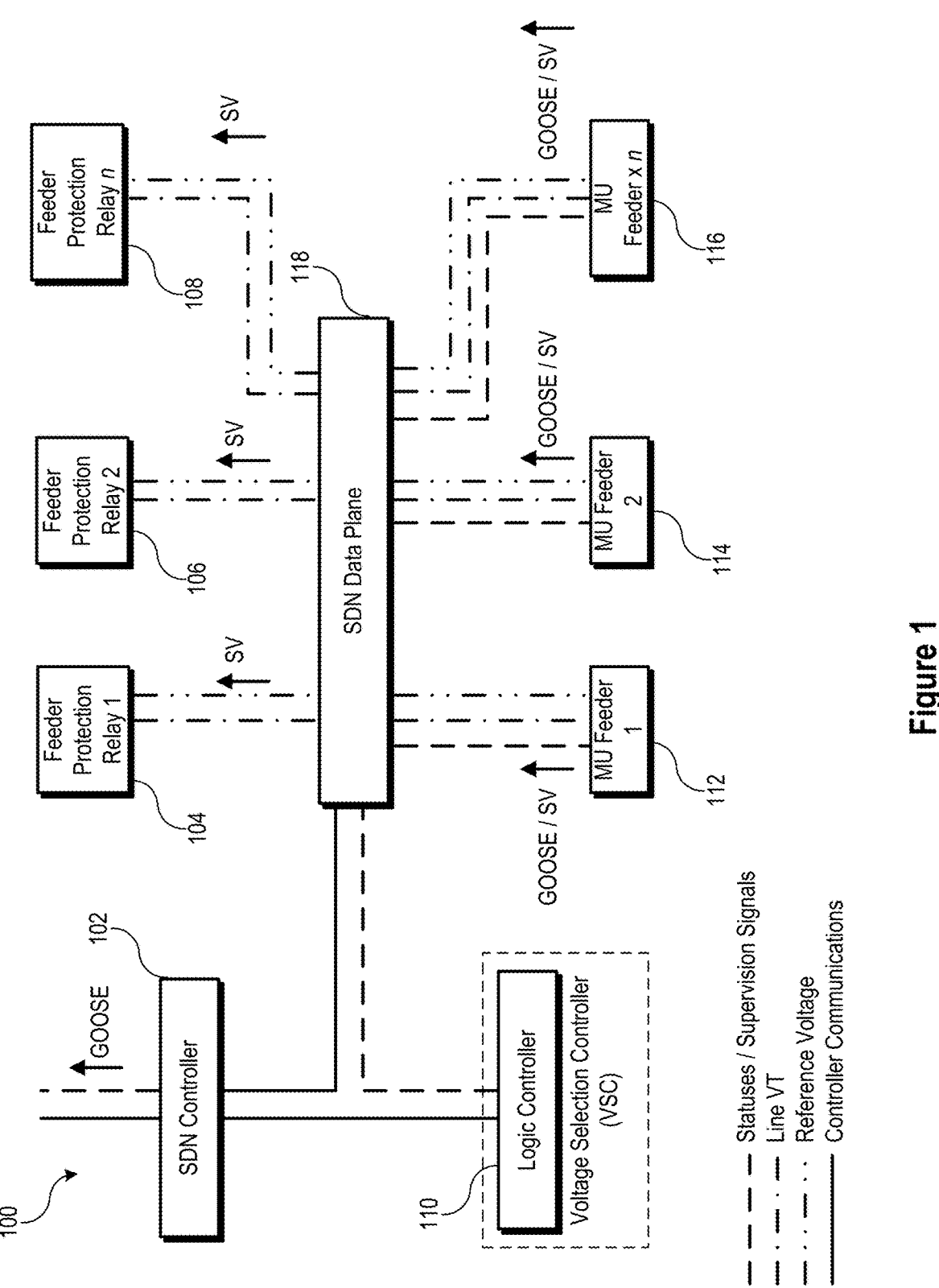
FIG. 1 illustrates a high-level diagram of a system for secondary signal distribution in a digital substation including a voltage selection controller (VSC) consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail to avoid obscuring aspects of the disclosure. Furthermore, the described features, structures, or characteristics may be combined in any suitable manner in one or more alternative embodiments.

DETAILED DESCRIPTION

Some switchgear (e.g., gas insulated switchgear) may not have busbar voltage transformers ("VTs") in a digital substation. This requires the line VTs associated with a feeder to be used as a reference for synchronism check functions, which may also be referred to as American National Standards Institute ("ANSI") Device Number 25. In a traditional secondary system design, this is achieved by a secondary circuit design that employs a voltage selection scheme that produces a reference voltage for each busbar and that is wired to all the Intelligent Electronic Devices ("IEDs") that use synchronism check. This method uses copper cables and auxiliary relays. As one of the objectives of a digital substation is to reduce the amount of copper cabling, a method should exist to perform similar functionality. The conventional method typically involves an IED subscribing to a voltage stream from each merging unit associated with a feeder. The IED must then determine which reference stream to use for synchronism check. This method has several drawbacks and problems, including:

The limited bandwidth of the network.

The number of subscriptions that can be supported are limited by hardware and/or software.

The complexity of the configuration increases because each subscribing IED relies on an independent determination of substation topology based on the status of all disconnect switches and breakers.

The complexity of modifications increases because each change must be implemented in all of the existing IEDs to account for the new configuration.

The above drawbacks increase in complexity as the number of feeders increase and is a function of the number of feeders in the substation.

The present disclosure employs the use of a centralized logic controller together with SDN technology to provide a digital method of performing voltage selection for synchronism check (ANSI 25) in a digital substation using sampled values. The benefits of this approach are as follows:

The solution is scalable to N x bays.

The solution uses digital substation technology and is not reliant on traditional methods.

The solution reduces the processing burden and configuration complexity on the subscribing IEDs.

The solution reduces the bandwidth requirements required in a digital substation.

The solution provides additional security and monitoring benefits.

The solution permits centralized implementation of modifications to a system.

FIG. 1 illustrates a high-level diagram of a system 100 for secondary signal distribution in a digital substation including a voltage selection controller (VSC) consistent with embodiments of the present disclosure. System 100 includes an SDN controller 102 to establish rules that determine how packets (or frames) should flow (or be forwarded) in the network. The SDN controller 102 communicates this information to the network devices, which constitute SDN data plane 118. The SDN controller 102 may set forwarding tables in network devices that establish how data is to be routed. This enables centralized configuration and management of a network. In addition to simplifying the management of a network, an SDN architecture may also enable monitoring and troubleshooting features that may be beneficial for use in a digital substation. Such benefits may include, but are not limited to: mirroring a selected flow rather than mirroring a whole port; alarming on bandwidth when it gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

System 100 includes a plurality of feeder protection relays 104, 106, and 108 and a plurality of merging units ("MU") 112, 114, and 116. The plurality of MUs 112, 114, and 116 may generate a stream of digitized measurements related to electrical parameters (e.g., voltage measurements, current measurements, frequency measurements). In the specifically illustrated embodiment, each MU generates a digital stream of statuses and/or supervision signals, a line voltage transformer signal, and a reference voltage signal. The streams may be communicated through an SDN data plane 118.

The plurality of feeder protection relays 104, 106, and 108 may also be in communication with SDN data plane 118. The plurality of feeder protection relays 104, 106, and 108 may subscribe to data streams generated by MUs 112, 114, and 116. Feeder protection relays 104, 106, and 108 may use the information from the data streams generated by MUs 112, 114, and 116 to provide a variety of protection functions for an associated feeder line. Such protection may include for example overcurrent protection, undervoltage protection, frequency monitoring, arc-flash protection, etc.

In the illustrated embodiment, MUs 112, 114, and 116 each publish two voltage streams, namely a line voltage transformer stream (shown using a dash-dot pattern) and a reference voltage stream (shown using a dash-dot-dot pattern). The line voltage transformer stream may be used by feeder protection relays 104, 106, and 108 in connection with a synchronizing or synchronism check function, American National Standards Institute ("ANSI") device number 25. The reference voltage stream may be published as a candidate for a reference busbar voltage that can be used by other subscribing IEDs for the ANSI 25 Element.

In the illustrated embodiments, the data streams generated by MUs 112, 114, and 116 may utilize various communication protocols. In the illustrated embodiment, the data streams may be communicated using the Generic Object Oriented Substation Event ("GOOSE") or Sampled Values ("SV") communication protocols. MUs 112, 114, and 116 may each publish a stream of GOOSE messages that include the statuses of the disconnect switches and breakers and system supervision signals (shown using a dashed line). Various types of equipment for electrically connecting or disconnecting components in an electric power system (e.g., disconnect switches, breakers, reclosers, gas-insulated switchgear, etc.) may be referred to herein as switching devices.

A logic controller 110 may receive status and supervision signals from MUs 112, 114, and 116. Logic controller 110 may receive a stream of information from MUs 112, 114, and 116 may analyze subsets of the data stream. Using the status and supervision signals, logic controller 110 may implement control actions in system 100. In the illustrated embodiment, logic controller 110 comprises a voltage selection controller (VSC). Logic controller 110 may determine the topology of the electrical system based on the statuses of the disconnect switches and breakers published by MUs 112, 114, and 116. Based on the determined topology, logic controller 110 may determine the best voltage reference for use by feeder protection relays 104, 106, and 108. The selected reference voltage may best represent a busbar voltage, and therefore may be used in an ANSI 25 synchronism element.

Logic controller 110 may communicate with SDN controller 102 and may establish communication flows between SDN data plane 118 and feeder protection relays 104, 106, and 108 to route the selected reference voltage stream. A feeder that is in steady-state electrical communication with a busbar will have the same voltage and frequency as the busbar, and as such, the electrical parameters associated with the feeder may be used as a proxy for the electrical parameters of the busbar. Upon initialization, the reference voltage streams from each MU 112, 114, and 116 may be in a disabled state in the SDN-controller 102. SDN controller 102 will enable the correct flows and program switches in SDN data plane 118 based on instruction from logic controller 110.

Figure 2:
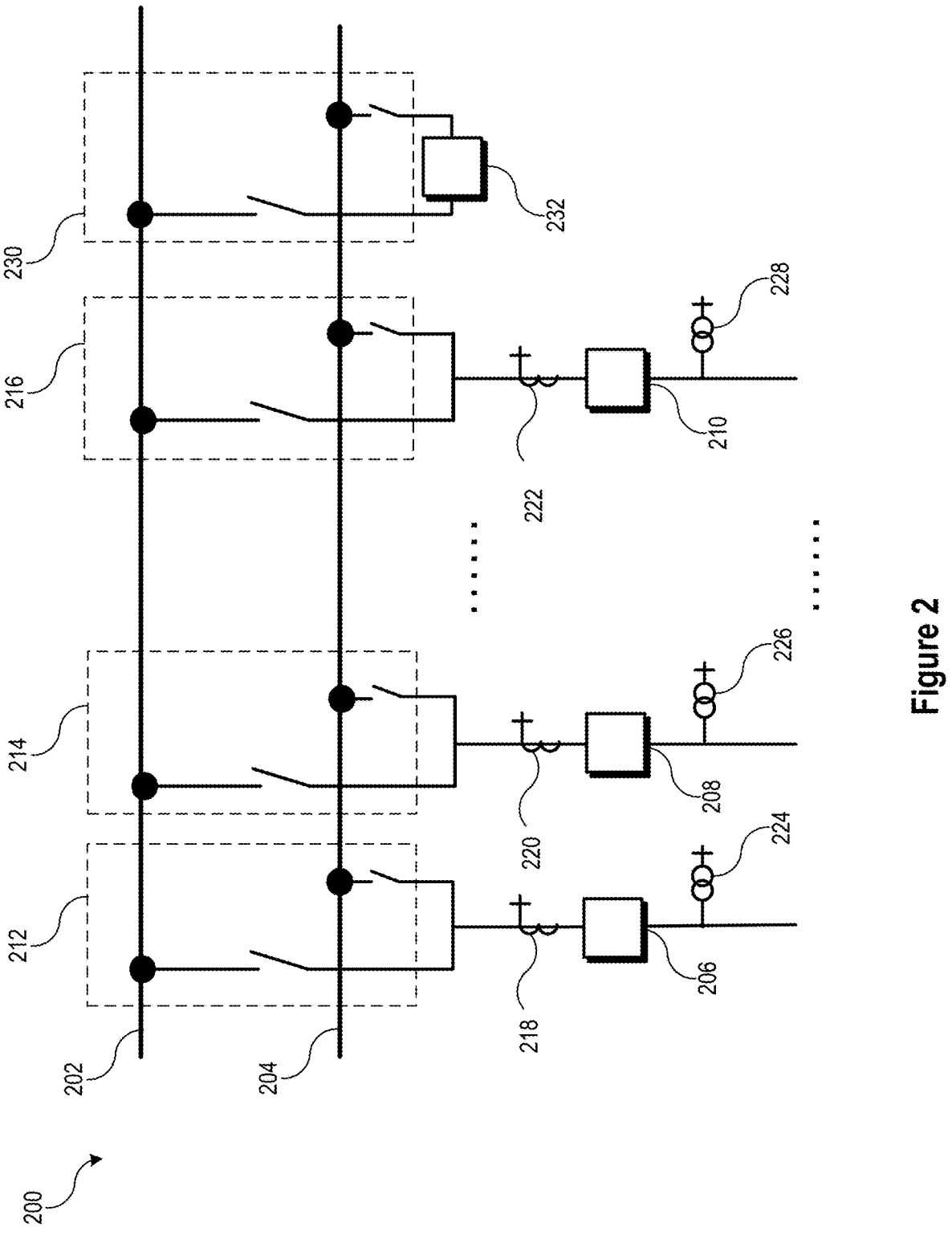
FIG. 2 illustrates a single-line diagram of a typical substation configuration in which a VSC solution may be implemented consistent with embodiments of the present disclosure.

FIG. 2 illustrates a single-line diagram of a typical substation configuration 200 in which a VSC solution may be implemented consistent with embodiments of the present disclosure. The monitoring and protection system described in FIG. 1 may be used in connection with typical substation configuration 200 to provide various features, including synchronism checks.

The typical substation configuration 200 illustrates two buses 202 and 204 and a plurality of feeders 206, 208, and 210. Each feeder 206, 208, and 210 may be selectively connected to bus 202 or bus 204 using a set of disconnect switches 212, 214, and 216. Each feeder 206, 208, and 210 may be associated with a voltage transformer 218, 220, and 222, respectively. Each feeder 206, 208, and 210 may also be associated with a current transformer. A MU (not shown) may be associated with the various voltage transformers 218, 220, and 222 and current transformers 224, 226, and 228.

The substation configuration shown in FIG. 2 does not include a busbar VT. Instead, the electrical parameters associated with one of feeders 206, 208, and 210 may be used as a proxy for the electrical parameters associated with a connected bus (i.e., bus 202 or bus 204).

A bus coupler 230 may connect buses 202 and 204 through breaker 232. Bus coupler 230 is not associated with a VT; however, embodiments consistent with the present disclosure may improve the monitoring and protection of such configurations. In the case where bus coupler breaker 232 is to be closed, a synchronism check must be performed to ensure that the electrical parameters of bus 202 and bus 204 are within established parameters before closing bus coupler breaker 232. In this scenario, a VT in communication with bus 202 and another VT in communication with bus 204 may be dynamically selected. The dynamically selected data streams may be provided to a bus relay or other protection device associated with typical substation configuration 200. The data streams from the dynamically selected VTs may then be used to perform a synchronism check.

Figure 3:
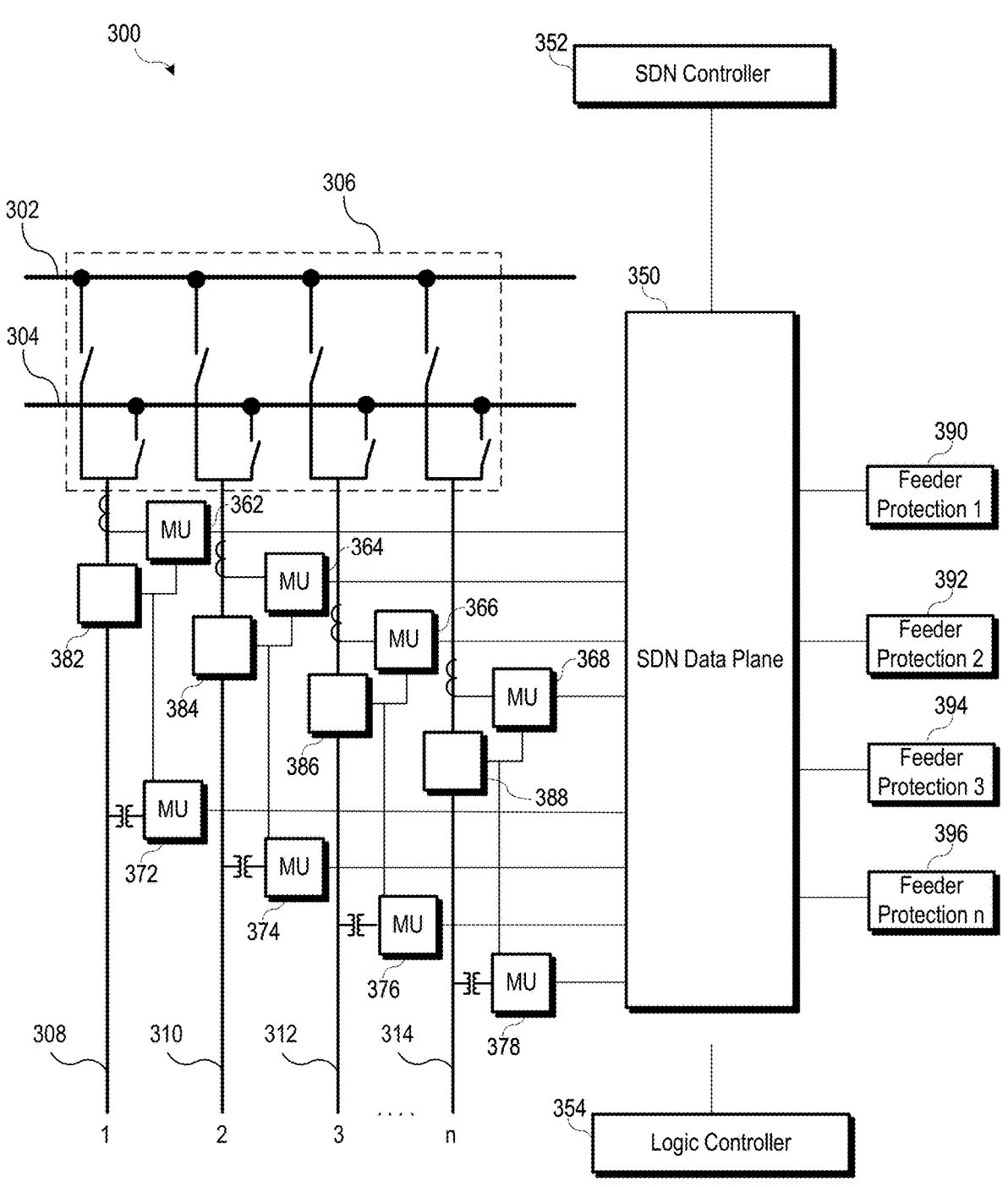
FIG. 3 illustrates a one-line diagram of a system comprising a portion of an electric power system and a protection and monitoring system consistent with embodiments of the present disclosure.

FIG. 3 illustrates a one-line diagram of a system 300 comprising a portion of an electric power system and a protection and monitoring system consistent with embodiments of the present disclosure. As one of skill in the art will appreciate, system 300 omits details about the electrical and logical connections between various devices. System 300 includes two buses 302 and 304. A plurality of disconnect switches 306 may selectively connect feeders 308, 310, 312, and 314 to bus 302 or 304.

Feeders 308, 310, 312, and 314 may be monitored by MUs 372, 374, 376, and 378, respectively. MUs 372, 374, 376, and 378 are each associated with a current transformer and monitor a current flowing through the feeder 308, 310, 312, or 314. MUs 362, 364, 366, and 368 are each associated with a voltage transformer and monitor a voltage associated with feeders 308, 310, 312, or 314. In other embodiments, a single MU may be associated with a current transformer and a voltage transformer. Such embodiments reduce the number of MUs in a system.

Each feeder 308, 310, 312, and 314 may also be associated with a breaker 382, 384, 386, and 388, respectively. Breakers 382, 384, 386, and 388 may be opened to disconnect the associated feeder 308, 310, 312, or 314 from both bus 302 and bus 304. The status (i.e., open or closed) of breakers 382, 384, 386, and 388 may also be monitored and communicated to logic controller 354.

The streams of data generated by the MUs 362, 364, 366, 368, 372, 374, 376, and 378 may be routed to a plurality of feeder protection relays 390, 392, 394, and 396 according to a plurality of communication flows established by SDN controller 352. SDN controller 352 may implement the plurality of communication flows through SDN data plane 350. SDN data plane 350 may comprise a plurality of programmable switches that route information between devices connected to SDN data plane 350 according to the communication flows established by SDN controller 352. Data streams and/or subsets of data streams may be routed throughout system 300 according to the plurality of communication flows. Among other information, a subset of the data representing a reference voltage may be provided to the plurality of feeder protection relays 380, 382, 384, 386 and for use in a synchronism check prior to connecting a feeder 308, 310, 312, or 314 to a bus 302 or 304 through SDN data plane 350.

Logic controller 354 may identify a reference voltage for bus 302 and bus 304 based on the status of breakers 382, 384, 386, and 388 and the plurality of breakers 306. For example, if breaker 382 is closed and feeder 308 is in electrical connection with bus 304, logic controller 354 may designate a reference voltage measured by MU 362 as a reference voltage for any other feeder protection relay that will connect to bus 304. Stated more generally, logic controller 354 may identify a reference voltage for bus 302 and/or bus 304 based on information provided by logic controller 354. SDN controller 352 may use such information to establish communication flows to route a reference voltage for the appropriate bus (i.e., bus 302 or 304) to feeder protection relays 380, 382, 384, and 386 to use as a reference voltage in connection with synchronism check.

One of skill in the art will recognize that dynamic selection and distribution of reference voltage measurements in system 300 may achieve several advantages. For example, system 300 may reduce the bandwidth needed to transmit reference voltages. In some embodiments, the reduction may be achieved by dynamically selecting a reference voltage associated with a particular bus or feeder and distributing the selected reference voltage to only those devices that may be electrically connected to the particular bus or feeder.

System 300 may also reduce the number of subscriptions used in system 300 by dynamically selecting an appropriate reference voltage. In the absence of dynamic selection, each feeder protection relay 380, 382, 384, and 386 may subscribe to each data stream published by each merging unit 362, 364, 366, 368, 372, 374, 376, and 378. As noted above, the number of subscriptions that can be supported on the subscribing IEDs are often limited by hardware and/or software. In systems consistent with the present disclosure, an IED may simply subscribe to a reference voltage that is dynamically selected by logic controller 354, and SDN controller 352 may implement appropriate communication flows to route the selected reference voltage. Accordingly, system 300 offers greater scalability and is scalable to N x bays because each relay may receive one or more dynamically selected streams without subscribing to all available streams.

The complexity of system 300 may be reduced in comparison to other schemes that do not utilize SDN technology by centralizing topology tracking and dynamic selection of appropriate data streams in logic controller 354 and routing in SDN controller 352. In contrast to system 300, in a conventional scheme, each subscribing IED may be required to track topology (i.e., the status of all the disconnect switches or breakers) and accurately select the correct reference voltage/stream based on the topology. As may be appreciated, implementing such schemes complicates the configuration of each of the protection IEDs. In contrast, centralizing such functions in logic controller 354 and utilizing SDN controller 352 to dynamical route appropriate data streams reduces the configuration burden.

Centralization of topology tracking and data routing may also facilitate modification and/or expansion of system 300. For example, if a new feeder is added to a system that lacks centralized topology tracking and data routing, each protection device may need to be updated with information about the new topology. In contrast, modifications or expansions of system 300 may be accommodated by updating the topology of system 300 in logic controller 354 and appropriately modifying the routing instructions implemented by SDN controller 352.

Finally, an SDN-based architecture may offer greater redundancy, flexibility, and security in comparison to other technologies. For example, an SDN-based architecture may help to avoid single points of failure by providing additional redundancy. An SDN-based architecture may also adjust routing within SDN data plane 350 based on a variety of factors, such as latency, throughput, etc. Such adjustments may improve the delivery of time-sensitive information, such as measurements in electric power systems. Finally, an SDN-based architecture may offer improved security. Critical infrastructure systems, such as electric power systems, may be the target of cyber-attacks, and as such, increased security may provide significant benefits.

FIG. 4 illustrates a functional block diagram of a control system 400 for use in an electric power system and consistent with embodiments of the present disclosure. System 400 may be implemented using hardware, software, firmware, and/or any combination thereof. In some embodiments, system 400 may be embodied as a logic controller, an IED, a protective relay, or other types of devices. Certain components or functions described herein may be associated with other devices or performed by other devices. The specifically illustrated configuration is merely representative of one embodiment consistent with the present disclosure. In some embodiments, system 400 may be incorporated into a voltage regulator, while in other embodiments, system 400 may be embodied as a separate device in communication with the voltage regulator.

System 400 includes a communications interface 416 to communicate with merging units, relays, IEDs, and/or other devices. In certain embodiments, the communications interface 416 may facilitate direct communication or communicate with systems over a communications network (not shown). In some embodiments consistent with the present disclosure, communications interface 416 may communicate with an SDN data plane. A variety of types of information may be provided to system 400 via communications interface 416. In one specific embodiment, a data stream comprising a plurality of voltage measurements associated with a plurality of locations within an electric power system may be provided. The data stream may comprise a consolidated representation of data gathered from a plurality of merging units distributed throughout an electric power system. Still further, system 400 may receive a plurality of status indicators associated with a plurality of devices configured to selectively connect and disconnect portions of the electric power system.

System 400 may include a time input 412, which may be used to receive a time signal (e.g., a common time reference) allowing system 400 to apply a time stamp to acquired samples. In certain embodiments, a common time reference may be received via communications interface 416, and accordingly, a separate time input may not be required for time-stamping and/or synchronization operations. One such embodiment may employ the IEEE 1588 protocol.

A monitored equipment interface 408 may receive status information from, and issue control instructions or protective actions to monitored equipment. In some embodiments, system 400 may perform a specific task within a power system (e.g., acting as a feeder protection relay), and monitored equipment interface 408 may enable communication between system 400 and an associated piece of monitored equipment. Control instructions may include, but are not limited to actuating disconnect switches, breakers, or reclosers to selectively connect or disconnect a portion of the electric power system. Of course, commands to operate monitored equipment may also be transmitted via communications interface 416 for implementation by other devices.

Processor 424 processes communications received via communications interface 416, time input 412, and/or monitored equipment interface 408. Processor 424 may operate using any number of processing rates and architectures. Processor 424 may perform various algorithms and calculations described herein. Processor 424 may be embodied as a general-purpose integrated circuit, an application-specific integrated circuit, a field-programmable gate array, and/or any other suitable programmable logic device. A data bus 414 may provide a connection between various components of system 400. A configuration subsystem 428 may allow an operator to configure various aspects of system 400, including criteria related to thresholds or parameters described above.

Instructions to be executed by processor 424 may be stored in computer-readable medium 426. Computer-readable medium 426 may comprise random access memory (RAM) and non-transitory memory. Computer-readable medium 426 may be the repository of software modules configured to implement the functionality described herein.

System 400 may include a sensor component 410. In the illustrated embodiment, sensor component 410 may receive current measurements 402 and/or voltage measurements 406. The sensor component 410 may comprise A/D converters 404 that sample and/or digitize filtered waveforms to form corresponding digitized current and voltage signals. Current measurements 402 and/or voltage measurements 406 may include separate signals from each phase of a three-phase electric power system. A/D converters 404 may be connected to processor 424 by way of data bus 440, through which digitized representations of current and voltage signals may be transmitted. Sensor component 410 may monitor the direction of power flow, and the direction of power flow may be used, along with the result of tap changes, to determine a direction of voltage regulation. As noted above, system 400 may perform specific tasks (e.g., monitoring voltages and/or currents at a location in an electric power system) in addition to other functions described herein.

A protective action subsystem 420 may implement a protective action based on various conditions in an electric power subsystem (e.g., detection of a fault condition or other anomalous condition). Protective actions may include actuating a switching device to interrupt the flow of electrical current through a portion of the electric power system. Protective actions may be implemented directly by system 400 or may be communicated to other devices to be implemented.

A topology subsystem 430 may monitor the topology of the electric power system over time. Topology subsystem 430 may monitor the topology of the electric power system using information regarding status indicators associated with a plurality of devices switching devices configured to selectively connect and disconnect portions of the electric power system. Topology subsystem 430 may identify portions of an electric power system that are in electrical communication and portions that are not in electrical communication. Such an identification may facilitate the dynamic selection of an appropriate reference voltage for purposes of a synchronism check prior to the connection of electrically disconnected portions of the electric power system.

A dynamic reference voltage selection subsystem 432 may identify a reference voltage from among a plurality of potential reference voltages. Information from topology subsystem 430 may be used to identify portions of an electric power system in an electrical power system that are in electrical communication. Prior to connecting a feeder (or other portion of the system), a synchronism check may ensure that the amplitude, frequency, and phase are within specified limits prior to connection. Connections made when the differences in amplitude, frequency, and phase exceed the threshold may result in stress and potential damage to the electric power system. Dynamic reference voltage selection subsystem 432 may identify a reference voltage that may be used by other devices for synchronism checks. As discussed above, use of a dynamically selected reference voltage may offer a variety of benefits.

An SDN interface subsystem 434 may coordinate the operation of system 400 with an SDN controller. An SDN controller may implement communication flows in an SDN fabric. The SDN controller may implement communication flows to route the selected reference voltage to various devices for use in connection with synchronism checks.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system for use in an electric power system, the system comprising:
   a communication interface configured to receive a plurality of data streams over time and comprising:
     a first data stream comprising a plurality of voltage measurements associated with a plurality of locations within an electric power system;
     a second data stream comprising a plurality of status indicators associated with a plurality of devices configured to selectively connect and disconnect portions of the electric power system;
   a topology subsystem configured to determine a topology of the electric power system based on the plurality of status indicators;
   a dynamic reference voltage selection subsystem configured to identify:
     a first subset of the plurality of voltage measurements associated with a first portion of the electric power system;
     a second subset of the plurality of voltage measurements of a second portion of the electric power system, the first portion of the electric power system and the second portion of the electric power system being electrically disconnected; and
     a protection device associated with the second portion of the electric power system; and a routing subsystem configured to dynamically route the first subset of the plurality of voltage measurements to the protection device associated with the second portion of the electric power system.

2. The system of claim 1, wherein the first subset of the plurality of voltage measurements is configured to be used by the protection device as a reference voltage in connection with a synchronism check prior to connection of the first portion of the electric power system and the second portion of the electric power system.

3. The system of claim 1, wherein the routing subsystem is configured to coordinate a plurality of communication flows with a software-defined network controller.

4. The system of claim 3, wherein the software-defined network controller is configured to implement communication flows within a software-defined network data plane.

5. The system of claim 1, wherein the first data stream comprises a consolidated representation of data gathered from a plurality of merging units distributed throughout the electric power system.

6. The system of claim 1, wherein the protection device comprises a feeder protection relay.

7. The system of claim 1, wherein the protection device comprises a bus protection relay.

8. A method for use in an electric power system, the method comprising:

receiving, using a communication interface, a plurality of data streams over time and comprising:
   a first data stream comprising a plurality of voltage measurements associated with a plurality of locations within an electric power system;
   a second data stream comprising a plurality of status indicators associated with a plurality of devices configured to selectively connect and disconnect portions of the electric power system;

determining, using a topology subsystem, a topology of the electric power system based on the plurality of status indicators;

identifying, using a dynamic reference voltage selection subsystem:
   a first subset of the plurality of voltage measurements associated with a first portion of the electric power system;
   a second subset of the plurality of voltage measurements of a second portion of the electric power system, the first portion of the electric power system and the second portion of the electric power system being electrically disconnected; and
   a protection device associated with the second portion of the electric power system; and dynamically routing, using a routing subsystem, the first subset of the plurality of voltage measurements to the protection device associated with the second portion of the electric power system.

9. The method of claim 8, further comprising wherein the first subset of the plurality of voltage measurements is configured to be used by the protection device as a reference voltage in connection with a synchronism check prior to connection of the first portion of the electric power system and the second portion of the electric power system.

10. The method of claim 8, wherein the routing subsystem is configured to coordinate a plurality of communication flows with a software-defined network controller.

11. The method of claim 10, wherein the software-defined network controller is configured to implement communication flows within a software-defined network data plane.

12. The method of claim 8, wherein the first data stream comprises a consolidated representation of data gathered from a plurality of merging units distributed throughout the electric power system.

13. The method of claim 8, wherein the protection device comprises a feeder protection relay.

14. A system for substation protection in an electric power system, comprising:
   a first bus;
   a plurality of feeders in electrical communication with the first bus;
   a plurality of voltage transformers in electrical communication with a respective feeder;
   a plurality of merging units in electrical communication with a respective voltage transformer;
   a protection device configured to receive signals from the plurality of merging units; and
   a programmable communications network in communication with the plurality of merging units and the protection device, the programmable communications network comprising:
      a communications network controller;
      a logic controller configured to dynamically select a voltage signal from one of the plurality of merging units as a reference voltage; and
      a plurality of programmable switches in communication with the communications network controller configured to provide a first dynamically selected reference voltage associated with the first bus to a first protection device.

15. The system of claim 14, comprising a topology subsystem;
   wherein the plurality of merging units are further configured to provide a plurality of status indicators associated with a plurality of switching devices in the electric power system and the topology subsystem is configured to determine a topology of the electric power system based on the plurality of status indicators.

16. The system of claim 15, wherein the logic controller is configured to provide the first dynamically selected reference voltage based on the topology of the electric power system.

17. The system of claim 16, wherein the protection device comprises a feeder relay.

18. The system of claim 14, further comprising a second bus;
   wherein the logic controller is further configured to provide a second dynamically selected reference voltage associated with the second bus to a second protection device.

19. The system of claim 18, wherein the second protection device comprises a bus protection relay.

20. The system of claim 14, wherein the programmable communications network comprises a software-defined network.

* * * * *